Aug. 16, 1949.                J. D. REESE                2,479,260
                               DERMATOME
Original Filed July 7, 1947                         2 Sheets-Sheet 1
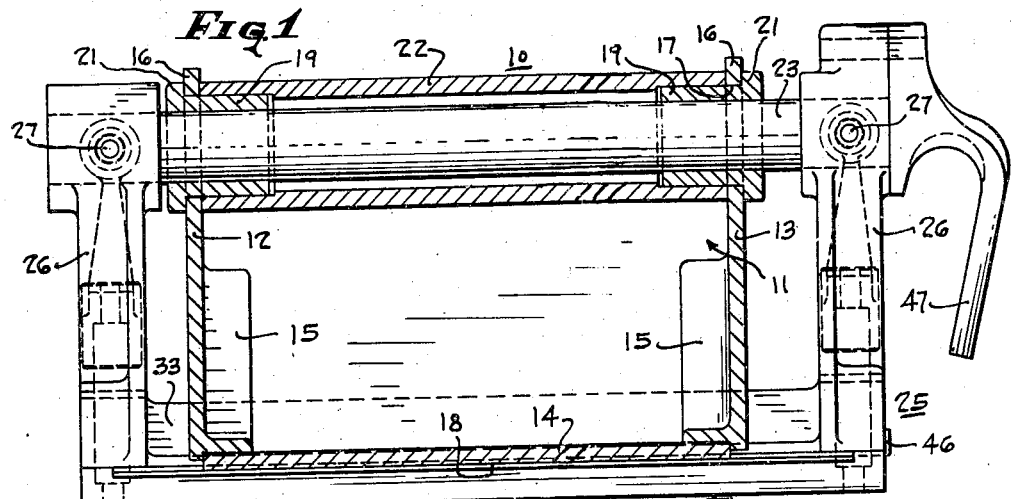
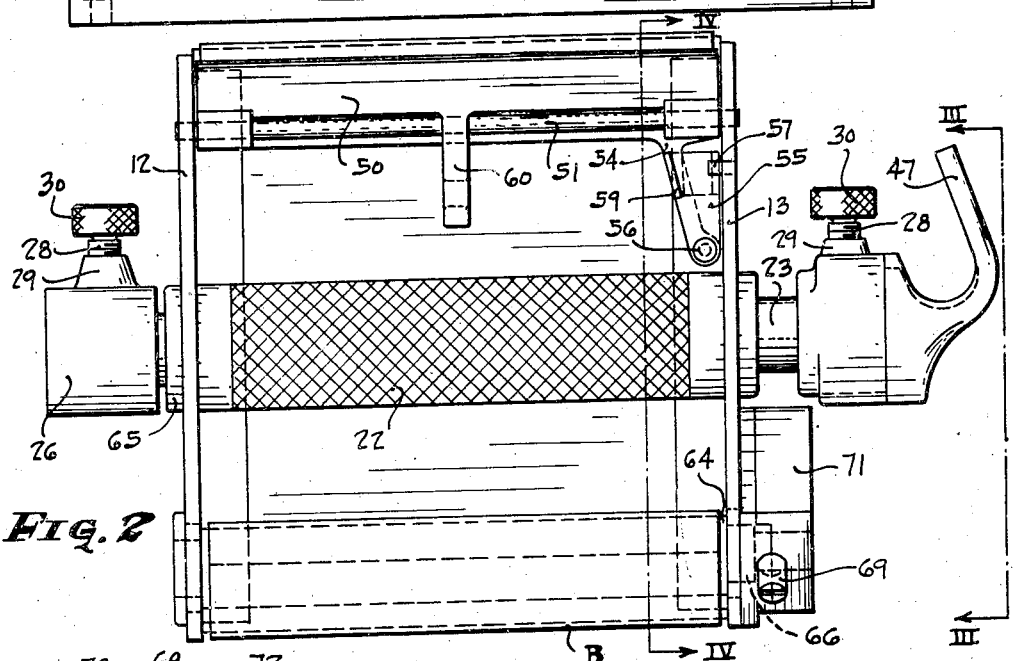
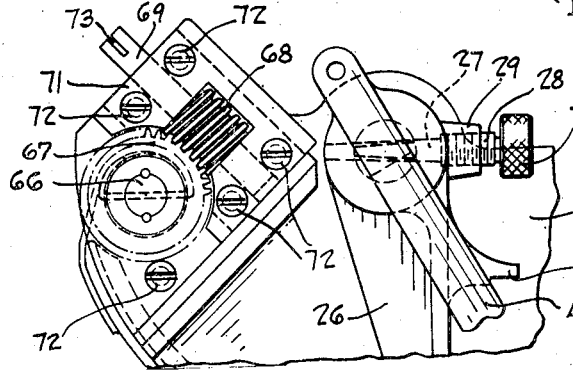
Inventor:-
John D. Reese
by Ralph T. French
Attorney

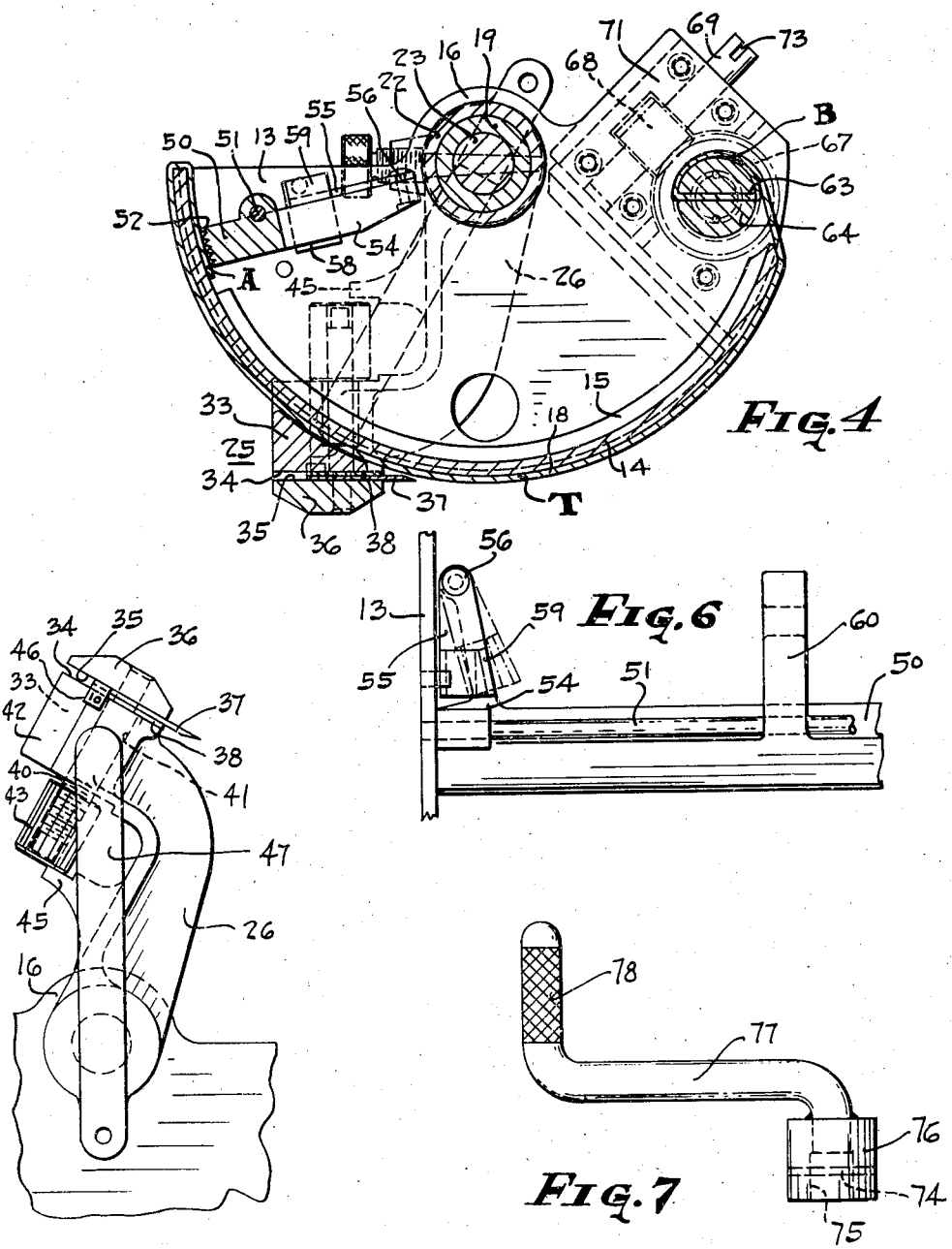

Patented Aug. 16, 1949

2,479,260

UNITED STATES PATENT OFFICE 2,479,260

DERMATOME

John D. Reese, Philadelphia, Pa.

Original application July 7, 1947, Serial No. 759,329. Divided and this application March 2, 1949, Serial No. 79,255

2 Claims. (Cl. 128—305)

This application is a division of applicant's co-pending application, Serial No. 759,329 filed July 7, 1947, for Dermatome. The parent application relates to the worm and gear feature, for tightening and retaining a flexible graft transfer member on a dermatome, while the present divisional application is concerned with the cutting-blade-adjusting mechanism.

The present invention relates to surgery, more particularly to skin grafting, and has for an object to provide an improved dermatome for cutting skin grafts.

This and other objects are effected by the invention as will be apparent from the following description and claims, taken in accordance with the accompanying drawings, forming a part of this application, in which:

Fig. 1 is a front elevational view, partially in section, of a dermatome constructed in accordance with the present invention;

Fig. 2 is a plan view of the dermatome shown in Fig. 1;

Fig. 3 is a fragmentary side elevational view, showing details of the worm and gear drive, and taken along the line III—III of Fig. 2, looking in the direction indicated by the arrows;

Fig. 4 is a transverse sectional view, taken along the line IV—IV of Fig. 2, looking in the direction indicated by the arrows;

Fig. 5 is a fragmentary side elevational view, showing details of the blade-supporting structure;

Fig. 6 is a fragmentary plan view showing details of the clamping mechanism; and, Fig. 7 is a side elevational view of a crank handle by which the worm mechanism may be operated.

Referring now to the drawings in greater detail, particularly to Figs. 1 and 4 thereof, the reference character 10 indicates, in its entirety, a dermatome having a body member 11 comprised by a pair of spaced parallel side plates 12 and 13 of generally semi-circular shape, joined along their curved edges by a concavo-convex bottom plate 14. Preferably, the side plates 12 and 13 are provided with inwardly-directed flanges 15 against which the bottom plate 14 rests. These flanges 15 not only provide extensive areas of engagement with the bottom plate, but also serve to stiffen the side plates and prevent deformation thereof.

Each side plate includes an upwardly-extending ear 16 having an opening 17 therethrough whose center coincides with the center of revolution of the concave working surface 18 of the bottom plate 14. A pair of bushings 19 are mounted in the openings 17 with flanges 21 abutting the outer surfaces of the side plates. A tubular handle 22 bridges the space between the side plates and is supported on the inwardly-projecting bushings 19.

A shaft 23 is journaled in the bushings 19 for both rotary and reciprocatory movement relative to the body member 11, and has fixedly secured thereto a yoke, indicated in its entirety by the reference character 25. The yoke 25 includes a pair of parallel posts or arms 26, secured one at each end of the shaft 23 by tapered dowel pins 27 (Figs. 2 and 4) provided with threaded portions 28 threaded into bosses 29 on the posts 26 and having knurled finger pieces 30 for rotation of the pins. The other ends of the posts are joined by an integral cross bar 33 having a flat outer surface 34, between which and an opposed flat surface 35 on a blade clamping bar 36, a graft-cutting blade or knife 37 is adapted to be clamped. (Figs. 4 and 5). As clearly shown in Fig. 4, the cutting edge of the blade 37 is positioned in close proximity to the convex working face 18 of the dermatome body member 11, and its spacing with respect thereto may be varied by changing a shim 38, between the blade and the surface 34 on the yoke cross bar 33, to one of greater or lesser thickness.

The blade-clamping bar has a pair of studs 40 extending perpendicularly from its face 35 and extending through a pair of mating openings 41 in the outer ends 42 of the posts 26, which outer ends are offset with respect to the remainder of the posts with the result that the free ends of the studs 40 project beyond the post outer ends 42 and threadedly receive knurled finger pieces 43, by which the blade-clamping bar 36 may be drawn into clamping relation to the blade 37.

Preferably, each post 26 is provided with a projecting lip 45 restraining the finger pieces 43 against axial movement and insuring that rotation of the finger pieces will produce movement of the blade-clamping bar 36 towards or away from the yoke cross bar 33. This action is particularly desirable inasmuch as the posts are usually in the position illustrated in Fig. 5 when the blade is being assembled or removed, and without the lips 45 the blade-clamping bar would not stay spaced from the cross bar to permit of ready assembly of the blade and shim. The shim may be provided with a tab 46 on which its thickness in thousandths of an inch is indicated, so that the thickness of the graft that will be cut can be noted at any time.

One of the posts 26 is provided with a handle 47, by which the entire yoke 25, its shaft 23 and the blade may be simultaneously reciprocated and rotated to move the blade with a cutting motion relative to the working face of the body member, and at a predetermined distance therefrom.

The mechanism for retaining a graft transfer member taut against the convex working face 18 includes a clamp 50 mounted for limited pivotal movement on the pin 51 into and out of clamping engagement with the end A of a graft transfer member T (Figs. 2, 4 and 6). The graft transfer member-engaging edge of the clamp 50 is toothed or serrated, as at 52, to bite into the transfer member and insure that the latter does not pull out from between the clamp and the inner surface of the body member.

To retain the clamp in clamping position there is provided a rearwardly-extending arm 54, on top of which is a second arm 55, pivoted to the rear end of the first arm 54, as at 56. When the arm 55 is moved against the adjacent side wall 13, as shown in full lines in Fig. 6, it lies beneath a pin 57 which projects from the side wall 13, whereby the clamp 50 is prevented from pivoting about its pin 51 from clamping position. To release the clamp, the upper arm is moved away from the side wall 13 to the position indicated in Fig. 6 by the dot-dash lines, which movement is limited by a downwardly-extending lug 58 thereon (Fig. 4). To assist in moving the upper arm, the latter has an upwardly-extending finger piece or tab 59, which may be easily engaged by the fingers of the operator. The clamp 50 has a rearwardly-extending handle 60 by which it may be easily moved to and from clamping position.

The opposite end B of the graft transfer member T is received in the slot 63 of a spool 64 journaled in bearings 65 carried by the body member side walls 12 and 13. One of the spool journals projects outwardly beyond the adjacent side wall 13, as at 66, and has secured thereon a gear 67 meshing with a worm 68 secured on the shaft 69. This shaft 69 is mounted in a gear housing 71, attached to the side wall 13 by screws 72 and enclosing the worm 68 and gear 67. One end of the worm shaft 69 projects through a top wall of the housing and is slotted, as at 73, for reception of a pin 74 extending diametrically of a socket 75 provided in the head 76 of a crank-type wrench 77, having a handle 78.

When the worm shaft 69 is rotated in a clockwise direction by means of the crank 77, the spool 64 will be turned counterclockwise, as viewed in Fig. 4, thereby tightening the graft transfer member.

While the invention has been shown in but one form, it will be apparent to those skilled in the art that it is not so limited, but is susceptible of various changes and modifications without departing from the spirit thereof.

What is claimed is:

1. In a dermatome of the type wherein a cutting member is supported for graft cutting movement with its cutting edge in parallel spaced relation to a graft-supporting surface; means for supporting the cutting member and including an arm having a notch in a side thereof and an opening through one wall of said notch, a clamping piece for said cutting member and including a pin disposed in said opening with a terminal portion extending into said notch, a finger piece in said notch and operatively associated with said terminal portion of the pin for imparting movement to the latter, a threaded connection between said pin and one of said pieces and a fixed connection between said pin and the other of said pieces, the opposed walls of said notch substantially limiting movement of the finger piece in directions parallel to the axis of said pin, whereby rotation of said finger piece relative to the axis of the pin produces movement of the clamping piece toward or away from said finger piece.

2. In a dermatome of the type wherein a cutting member is supported for graft-cutting movement with its cutting edge in parallel spaced relation to a graft-supporting surface; means for supporting the cutting member and including an arm, a head on said arm having an opening therethrough from one side to the opposite side thereof, a stud in said opening with its terminal portions projecting beyond said sides of the head, a cutting-member-clamping piece associated with one of the stud terminal portions, a finger piece associated with the other of the stud terminal portions, one of said pieces being threadedly connected to its stud terminal portion and the other of said pieces being fixedly secured to its stud terminal portion, and means preventing substantial movement of said finger piece away from said head, whereby rotation of said finger piece in one direction produces movement of the clamping piece away from the head to provide space between the head and clamping piece for reception of the cutting member, and rotation of the finger piece in the opposite direction draws the clamping piece towards the head to clamp the cutting member therebetween.

JOHN D. REESE.

No references cited.